(12) United States Patent
Jarvis et al.

(10) Patent No.: US 9,034,089 B2
(45) Date of Patent: May 19, 2015

(54) INK FORMULATION

(75) Inventors: Anthony Jarvis, Cheshire (GB); Martin Walker, Cheshire (GB); Adam O'Rourke, Cheshire (GB); Richard Cook, Cheshire (GB)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 14/127,110

(22) PCT Filed: Aug. 12, 2011

(86) PCT No.: PCT/EP2011/063911
§ 371 (c)(1),
(2), (4) Date: Jan. 31, 2014

(87) PCT Pub. No.: WO2013/023672
PCT Pub. Date: Feb. 21, 2013

(65) Prior Publication Data
US 2014/0147775 A1  May 29, 2014

(51) Int. Cl.
*C09D 11/50*  (2014.01)
*B41M 5/32*  (2006.01)
*B41M 5/26*  (2006.01)

(52) U.S. Cl.
CPC ............... *B41M 5/32* (2013.01); *B41M 5/262* (2013.01); *B41M 5/267* (2013.01); *C09D 11/50* (2013.01)

(58) Field of Classification Search
CPC ...... C09D 11/50; B41M 5/262; B41M 5/267; B41M 5/32
USPC ............ 106/31.14, 31.16, 31.2, 31.32, 31.64; 427/595, 596; 430/292
See application file for complete search history.

(56) References Cited

U.S. PATENT DOCUMENTS

| | | | |
|---|---|---|---|
| 6,096,895 A | 8/2000 | Brown et al. | |
| 6,206,982 B1 | 3/2001 | Hughes et al. | |
| 7,270,919 B2 * | 9/2007 | Stubbs | 430/17 |
| 8,048,605 B2 * | 11/2011 | Khan et al. | 430/292 |
| 8,048,608 B2 * | 11/2011 | Jarvis et al. | 430/292 |
| 8,173,253 B2 * | 5/2012 | Green et al. | 428/354 |
| 8,278,243 B2 * | 10/2012 | Khan et al. | 503/201 |
| 8,308,860 B2 * | 11/2012 | Jarvis | 106/31.32 |
| 8,398,760 B2 * | 3/2013 | Jarvis | 106/31.32 |
| 8,637,114 B2 * | 1/2014 | Wyres et al. | 427/150 |
| 8,765,855 B2 * | 7/2014 | Thaker | 524/407 |
| 2009/0226835 A1 | 9/2009 | Mayo et al. | |
| 2010/0018957 A1 * | 1/2010 | Khan | 219/121.85 |
| 2010/0279079 A1 | 11/2010 | Campbell et al. | |
| 2014/0099267 A1 * | 4/2014 | Jarvis et al. | 106/31.32 |
| 2014/0147392 A1 * | 5/2014 | O'Rourke et al. | 424/10.1 |

FOREIGN PATENT DOCUMENTS

| | | |
|---|---|---|
| CN | 101626903 A | 1/2010 |
| WO | WO 02/01250 | 1/2002 |
| WO | WO 2008/075101 A2 | 6/2008 |

OTHER PUBLICATIONS

International Search Report issued by the EPO in corresponding International Application No. PCT/EP2011/063911, dated Sep. 25, 2012 (2 pages).
Djordjevic et al., "Synthesis and Properties of Peroxo α-Amino Acid Complexes of Molybdenum(VI). The Structures of $MoO(O_2)_2(HAA)(H_2O)$, HAA = Glycine, Proline", Inorganic Chimica Acta. vol. 104, 1985, pp. L7-L9.
Serdiuk et al., "Synthesis and spectroscopic properties of novel poolynuclear molybdenum(VI) peroxo complexes containing amino acides", Transition Metal Chemistry vol. 26, 2001, pp. 538-543.
Djordjevic et al., "Molybdenum(VI) Peroxo α-Amino Acid Complexes: Synthesis, Spectra, and Properties of $MoO(O_2)_2(\alpha\text{-}aa)(H_2O)$ for α-aa = Glycine, Alanine, Proline, Valine, Leucine, Serine, Asparagine, Glutamine, and Glutamic Acid. X-ray Crystal Structures of the Glycine, Alanine, and Proline Compounds", Inorganic Chemistry vol. 36, 1997, pp. 1798-1805.
Sastry et al., "Homonuclear molybdenum(VI) and heteronuclear molybdenum(VI) copper(II) peroxo complexes containing amino acids", Transition Metal Chemistry vol. 21, 1996, pp. 410-412.

* cited by examiner

*Primary Examiner* — Helene Klemanski
(74) *Attorney, Agent, or Firm* — Finnegan, Henderson, Farabow, Garrett & Dunner, LLP

(57) ABSTRACT

The disclosed invention relates to the use of molybdenum (VI) peroxo complex containing an amino acid, such as $MoO(O_2)_2(GLY)(H_2O)$, in marking applications, as well as to ink formulations comprising such complexes.

20 Claims, No Drawings

INK FORMULATION

CROSS-REFERENCE TO RELATED APPLICATIONS

This is a U.S. National Phase Application of International Application No. PCT/EP2011/063911, filed Aug. 12, 2011, which is incorporated herein by reference.

FIELD OF THE INVENTION

The present invention relates to marking compounds, compositions, i.e. ink formulations, comprising such marking compounds, and its use in marking applications. Specifically, the present invention relates to use of marking compounds comprising transition metal peroxyanions in marking applications.

BACKGROUND

In the art various proposals have been made to achieve effective printing on substrates by causing a change of color in the substrate on which the printing is to appear. Such printing may result in marking, such as an image, a letter, a figure, a text, etc. As an example, a sell-by-date may be printed on prepack coated with marking components, i.e. activatable pigments.

Various marking compounds, i.e. activatable pigments, have been proposed, which may be used to mark a substrate upon irradiation, such as by laser. As an example, WO 02/01250 discloses the use of various oxymetal salts, such as ammonium octamolybdate (AOM), in laser marking applications.

However, as recognized in the art, laser markable aqueous compositions based on AOM suffer from giving rise to an opaque coating before activation. In addition the reactivity of AOM is, for some applications, deemed to be to low.

SUMMARY

Consequently, the present invention seeks to mitigate, alleviate, eliminate or circumvent one or more of the above-identified deficiencies in the art and disadvantages singly or in any combination by use of molybdenum (VI) peroxo complex containing an amino acid in marking applications. By such use, coatings with greater reactivity (in terms of fluence versus optical density) and better transparency may be obtained. Molybdenum (VI) peroxo complex containing an amino acid may be represented by the general formula (I)

$$Mo_xO_y(O_2)_zL_a(H_2O)_b \quad (I)$$

wherein "x" is an integer of 1 to 5, such as 1, 2, or 3; "y" is an integer of 1 to 10, such as 1, 4, or 7; "z" is an integer of 1 to 5, such as 2; "a" is an integer of 1 to 3, such as 1; "b" is an integer of 1 to 10, such as 1, 4, or 6; and L is an amino acid. The amino acid may be selected from the group consisting of glycine, alanine, valine, leucine, isoleucine, proline, methionine, serine, threonine, asparagine, glutamine, aspartic acid, glutamic acid, lysine, histidine, and glycylglycine. Preferably, the amino acid is glycine.

A further aspect of the invention relates to composition comprising such a molybdenum (VI) peroxo complex containing an amino acid, a solvent, and a water-soluble or water-dispersable polymeric binder. Typically the solvent is an aqueous solvent. In addition the composition may comprise a light absorbing agent that absorbs light in the wavelength range 700 nm to 2500 nm, such as reduced indium tin oxide.

A further aspect of the invention relates to substrate coated with such a composition. The substrate may be paper, cardboard, corrugated paper board, plastic film, ridged plastic parts, textile, wood, metal, glass, leather, foodstuff, or a solid pharmaceutical composition. Optionally the coated substrate may be over laminated by a polyolefin, such as polyethylene.

A further aspect of the invention relates to a process for marking a substrate. In such a process a substrate is coated with a composition as described herein above. Subsequently, those parts of the coated substrate, where a marking is intended, are exposed to light in the wavelength range from 100 nm to 20,000 nm to generate a marking. Typically, the light is supplied by a $CO_2$ laser operating in the wavelength range 10,000 nm to 11,000 nm, or a laser, a diode or diode array system operating in the wavelength range 700 to 2500 nm. Rather than exposing those parts of the coated substrate, where a marking is intended, to light in the wavelength range from 100 nm to 20,000, the parts where a marking is intended may be exposed to non-contact heat, or contact heat supplied using a thermal printer.

A further aspect of the invention relates to marked substrate obtainable by such a process.

Further advantageous features of the invention are defined in the dependent claims. In addition, advantageous features of the invention are elaborated in embodiments disclosed herein.

DETAILED SUMMARY OF PREFERRED EMBODIMENTS

Various molybdates are known within the art. As an example, molybdate has been used as corrosion inhibitor in industrial water treatment. Further, molybdates have found some use as replacement for chromate in anti-corrosion applications. However, its use in anti-corrosion applications is fairly limited as it displays only moderate corrosion inhibition.

In addition, ammonium octamolybdate (AOM) has found use in laser marking applications. In such applications, a substrate to be marked is typically coated a with an ink formulation comprising AOM. Subsequently, the parts of the coated substrate, where a marking is intended, are irradiated to obtain a marking. However, as already outlined laser markable aqueous compositions based on AOM suffer from giving rise to an opaque coating before activation having low transparency. In addition the reactivity, i.e. the fluence required to obtain a certain optical density, is, for some applications, to low.

It has been unexpectedly found, that also molybdenum (VI) peroxo complex containing an amino acid changes color upon exposure to heat. Similar to AOM, such complexes thus constitute a material that may be marked, i.e. had to change color, directly with 10,600 nm laser radiation. Accordingly, such complexes are suitable for use in marking applications, wherein an image, a letter, a figure, a text, etc. is aimed at.

Molybdenum (VI) peroxo complexes containing an amino acid are more reactive than AOM, i.e. less fluence is required to obtain the same optical density. Further, Molybdenum (VI) peroxo complexes containing an amino acid in general display better water solubility than AOM. In addition, coatings with better transparency may be obtained with compositions comprising molybdenum (VI) peroxo complex containing an amino acid. Some amino acids, such as glycine, will even provide essentially clear solutions ones dissolved in water.

Hence, an embodiment relates to use of molybdenum (VI) peroxo complexes containing an amino acid in marking applications. Molybdenum (VI) peroxo complex containing amino acids, may be represented by the general formula (I)

$$Mo_xO_y(O_2)_zL_a(H_2O)_b \qquad (I)$$

wherein "x" is an integer of 1 to 5, such as 1, 2, or 3; "y" is an integer of 1 to 10, such as 1, 4, or 7; "z" is an integer of 1 to 5, such as 2; "a" is an integer of 1 to 3, such as 1; "b" is an integer of 1 to 10, such as 1, 4, or 6; and L is an amino acid.

Synthesis, properties and characterization of such complexes haven been reported previously within the art (cf. Djordjevic et al Inorganic Chimica Acta 104 (1985) L7-L9, Serdiuk et al Transition Metal Chemistry 26 (2001) 538-543, Djordjevic et al Inorganic Chemistry 36 (1997) 1798-1805, Sastry et al Transition Metal Chemistry 21 (1996) 410-412).

Examples of amino acids which may be used to obtain molybdenum (VI) peroxo complex containing an amino acid may be selected from the group consisting of glycine, alanine, valine, leucine, isoleucine, proline, methionine, serine, threonine, asparagine, glutamine, aspartic acid, glutamic acid, lysine, histidine, and glycylglycine. Preferably, the amino acid is glycine.

Further also molybdenum (VI) peroxo complex with other ligands, such as quinoline, 2-picoline, as well as various aroylhydrazones, are known within art.

It has further been found that complexes, such as complexes wherein the amino acid is glycine, are readily soluble in water. Thus, clear aqueous ink formulations may be obtained by dissolving such marking complexes in aqueous solutions. Substrates coated with such compositions, will, in contrast to surfaces coated with aqueous dispersions of AOM (cf. WO 02/01250), be essentially clear, i.e. not opaque. Complexes wherein the amino acid is glycine may be represented by the following formula $MoO(O_2)_2(GLY)(H_2O)$.

A preferred embodiment relates to the use of a molybdenum (VI) peroxo complex containing an amino acid, wherein the amino acid is glycine, in marking applications.

When used in marking applications, the molybdenum (VI) peroxo complex containing an amino acid a laser may be used to create a marking, by having the molybdenum (VI) peroxo complex containing an amino acid change color.

Further, coatings obtained by use of aqueous ink formulations, comprising a molybdenum (VI) peroxo complex containing an amino acid, such as glycine, are substantially visible light-transparent. Such coatings are thermally sensitive and find utility in thermally driven color change and imaging applications, such as coding and marking; using for example: thermal light sources such as, bulb/mask arrangements, scanning lasers, diode arrays, or thermal contact printers, provide effective imaging, without opacification in the non-image areas.

Furthermore, the aqueous solubility properties of molybdenum (VI) peroxo complexes containing an amino acid, such as glycine, permit the avoidance of the time-consuming, wasteful and costly milling processes normally involved in the preparation of coating mixtures for known thermally sensitive imaging materials. They also allow thermally sensitive layers of good transparency and gloss, that are essentially colorless, to be made on transparent substrates such as: PET, BOPP and cellulose based films, and it allows the thermally sensitive layers to be applied to pre-printed substrates with only a negligible effect on the appearance of said substrate.

Molybdenum (VI) peroxo complexes containing an amino acid may have one or more of the following properties: (i) Soluble in water, (ii) Transparent or near transparent film-forming properties on substrates when applied by coating or printing an aqueous based formulation or ink, (iii) Thermal sensitivity manifested as a color change of good visual discrimination when a layer comprising molybdenum (VI) peroxo complex containing an amino acid is exposed thermally imagewise by an IR bulb/mask, scanning laser or diode array, and/or heat block imaged by a thermal contact printer (iv) Compatibility with at least one water compatible binder system as indicated by the formation of a near transparent film of a blend. Thus, such compounds may advantageously be used to obtain transparent coatings on substrates to be marked. Preferably, the amino acid in the molybdenum (VI) peroxo complex is glycine.

Further, compositions comprising $MoO(O_2)_2(GLY)(H_2O)$, when coated or printed on an inert substrate, such as clear PET film or on top of a pre-printed substrate, and dried, form a continuous layer i.e. coating, that is substantially transparent to visible light. Such coatings are thermally sensitive and find utility in thermographic materials and on 3D objects for imaging by IR bulbs/masks, scanning lasers, diode arrays or thermal contact printers.

Clear coatings formed by means of compositions disclosed herein may also be useful on opaque substrates because they can impart desirable gloss, as distinct from compositions containing suspended insoluble molybdates that give matt surfaces Another embodiment relates to an ink formulation. Such a ink formulation may be a composition comprising molybdenum (VI) peroxo complex containing an amino acid, a solvent, and a water-soluble or water-dispersable polymeric binder, wherein said complex is complex according to the general formula (I)

$$Mo_xO_y(O_2)_zL_a(H_2O)_b \qquad (I)$$

wherein "x" is an integer of 1 to 5, such as 1, 2, or 3; "y" is an integer of 1 to 10, such as 1, 4, or 7; "z" is an integer of 1 to 5, such as 2; "a" is an integer of 1 to 3, such as 1; "b" is an integer of 1 to 10, such as 1, 4, or 6; and L is an amino acid. Preferably, the amino acid in the molybdenum (VI) peroxo complex is glycine, whereby said complex may be represented by the following formula $MoO(O_2)_2(GLY)(H_2O)$.

Typically, although not necessary, the solvent is an aqueous solvent. The aqueous solvent may consist of only water. However, it may also comprise one or several water-miscible organic solvent(s).

Examples of such water-miscible organic solvent include C1-4-alkanols, C2-4-polyols, C3-6-ketones, C4-6-ethers, C2-3-nitriles, nitromethane, dimethylsulfoxide, dimethylformamide, dimethylacetamide, methyl pyrolidone and sulfolane, whereby C1-4-alkanols and C2-4-polyols may be substituted with C1-4-alkoxy groups.

Examples of C1-4-alkanols are methanol, ethanol, propanol, isopropanol or butanol, isobutanol, sec-butanol and tert-butanol.

Examples of a C1-4-alkoxyderivatives thereof are 2-ethoxyethanol and 1-methoxy-2-propanol. Examples of C2-4-polyols are glycol and glycerol.

Examples of C3-6-ketones are acetone and methyl ethyl ketone. Examples of C4.6-ethers are dimethoxyethane, diisopropylethyl and tetrahydrofurane.

An example of a C2-3-nitrile is acetonitrile.

Preferably, the water-miscible organic solvent is selected from the group consisting of C1-4-alkanols, C2-4-polyols, C3-6-ketones, dimethylformamide and dimethylacetamide, whereby C1-4-alkanols and C2-4-polyols may be substituted with C1-4-alkoxy groups.

Examples of non-aqueous solvents include ethanol, ethyl acetate and methyl ethyl ketone.

The water-soluble or water-dispersable polymeric binder may be one or more of a range of water-soluble or aminestabilised aqueous emulsion polymers suitable for use in water-based coating or ink formulations. As an example acrylic polymers may be used.

The herein disclosed marking complexes, i.e. molybdenum (VI) peroxo complexes containing an amino acid, may be caused to change color by use of laser radiation having a wavelength of about 10 μm. Such laser light may be provided by mid-IR $CO_2$ lasers with an emission wavelength in the range 10,000 nm to 12,000 nm.

However, mid-IR $CO_2$ lasers are less suitable for installation into existing production lines due to their physical bulk size. An NIR fiber laser may have a small print-head fitted to the production line, connected to the laser, several meters away, via an umbilical cord. Thus, said disadvantage may be overcome by use of NIR (near infra-red) laser.

In order to allow for use of NIR-lasers, the composition may comprise a light absorbing agent that absorbs light in the wavelength range 700 nm to 2500 nm, i.e. NIR-absorbers. The light absorbing agent may convert the absorbed near infra-red laser irradiation into conductive heat. Thus, NIR-lasers may be used to change color of the composition. Accordingly, the composition may further comprise a light absorbing agent that absorbs light in the wavelength range 700 nm to 2500 nm to allow for use the composition in NIR-laser printing applications.

The light absorbing agent may be selected from the group consisting of organic dyes/pigments, inorganic pigments, e.g. copper (II) hydroxyl phosphate, non-stoichiometric inorganic pigments, and conductive polymers.

Organic dye/pigment types. These types of light absorbing agents comprise, but are not limited to: families of metallo-porphyrins, metallo-thiolenes, such as nickel, platinum and palladium dithiolenes, and polythiolenes, metallo-phthalocyanines, aza-variants of these, annellated variants of these, pyrylium salts, squaryliums, croconiums, amminiums, diimoniums, cyanines and indolenine cyanines.

Examples of organic dyes that may be used in the present invention are taught in U.S. Pat. No. 6,911,262, and are given in Developments in the Chemistry and Technology of Organic dyes, J Griffiths (ed), Oxford: Blackwell Scientific, 1984, and Infrared Absorbing Dyes, M Matsuoka (ed), New York: Plenum Press, 1990. Further examples of the NIR dyes or pigments of the present invention can be found in the Epolight™ series supplied by Epolin, Newark, N.J., USA; the ADS series supplied by American Dye Source Inc, Quebec, Canada; the SDA and SDB series supplied by HW Sands, Jupiter, Fla., USA; the Lumogen™ series supplied by BASF, Germany, particularly Lumogen™ IR765, IR788 and IR1055; the Pro-Jet™ series of dyes supplied by FujiFilm Imaging Colorants, Blackley, Manchester, UK, particularly Pro-Jet™ 830NP, 900NP, 825LDI and 830LDI; the Filtron™ products supplied by Gentex Corp of Carbondale, Pa., and those sold by Few Chemicals GmbH of Bitterfeld-Wolfen, Germany.

An example of an NIR dye particularly suitable for use with lasers with an emission wavelength in the range 1,000 nm to 1,200 nm is N,N,N',N'-tetrakis(4-dibutylaminophenyl)-p-benzoquinone bis(iminium hexafluoroantimonate).

Stoichiometric Inorganic Pigment Types.

These types of light absorbing agents comprise, but are not limited to oxides, hydroxides, sulfides, sulfates, borides, nitrides and phosphates of metals such as copper, bismuth, iron, nickel, tin, indium, zinc, manganese, zirconium, tungsten, titanium, lanthanum, and antimony. Also included are coated micas known as Iriodin products supplied by MERCK, mixed metal oxides such as antimony tin oxide and tungsten bronzes. Copper salts are particularly preferred and the most preferred copper salt is copper (II) hydroxyl phosphate.

Non-Stoichiometric Inorganic Pigment Types.

Non-stoichiometric refers to the ratio of elements in the compound not being integers. For a typical metal oxide, the compound can be reduced where there is a deficiency of oxygen, or oxidized where there is a deficiency of metal. Suitable non-stoichiometric compounds comprise, but are not limited to: non-stoichiometric oxides, hydroxides, sulfides, sulfates, borides, nitrides and phosphates of metals such as copper, bismuth, iron, nickel, tin, indium, zinc, manganese, zirconium, tungsten, titanium, lanthanum, and antimony. Also included are non-stoichiometric mixed metal oxides, and doped metal oxides. Particularly preferred examples include non-stoichiometric titanium nitride, zinc oxide, antimony tin oxide, tungsten oxide, and indium tin oxide. The most preferred non-stoichiometric compound is reduced or blue indium tin oxide. The term non-stoichiometric also includes doped metal compounds, such as doped metal oxides. Examples include aluminum doped zinc oxide and fluorine doped tin oxide and tin doped indium oxide.

Conductive Polymers.

Conductive polymers are materials that, in the polymerized state, comprise linked monomers (typically rings) that are conjugated and which can therefore allow delocalization/conduction of positive or negative charge. The conjugation allows an absorption shift that can be controlled such that it applies to the wavelength of irradiation, and which may also depend on the concentration of the polymer. Examples of monomers that can be conjugated to give suitable conducting polymers are aniline, thiophene, pyrrole, furan and substituted derivatives thereof. Such polymers, in addition to providing the desired means of transferring heat from a low-power laser, have the advantage that they do not readily diffuse out of the coating material. They can also act as the polymer binder. Yet another advantage of such materials is that they can be colorless, even at high loading (up to 5% by weight); this is by contrast to monomeric species that have been used, such as phthylocyanine, which absorb at about 800 nm but give the composition a greenish tinge, even at a loading of 0.1 wt %. Examples of conducting polymer products suitable for use in the present invention include: Baytron (Bayer), Clevios (HC Starck) and Orgacon (Agfa) products that are known to comprise PSS/PEDOT.

Further examples of other suitable NIR absorbers are taught in WO2005/012442, WO2005/068207, WO2007/141522 and WO2008/050153.

The most preferred NIR absorbers are those that have an essentially negligible impact on the color of the coating, and on the transparency of the coating. It is also preferred that the absorbance profile of the absorber matches the emission profile of the light/laser source, this gives rise to low fluence imaging. It is preferable to make the transparent coating imageable with a near infrared light source, such as a NIR laser or diode array system, regardless of whether it has been over laminated or not. According to an embodiment the NIR absorber may be reduced or blue indium tin oxide nanopowder. It is preferred that reduced or blue indium tin oxide is used in combination with a light source with an emission wavelength at approximately 1,500 nm. A 1,550 nm NIR laser is a particularly preferred example. Reduced or blue indium tin oxide, in combination with a 1,550 nm NIR laser, may be used at concentration <5 wt %. The coat weights may be less than 10 g/m². At these parameters the transparent coatings are essentially colorless as well as mostly transparent, but have strong 1,550 nm NIR absorbance and give rise to low fluence laser imaging. The presence of an NIR absorber in the transparent coating does not usually have a negative effect on its $CO_2$ laser imageability, indeed $CO_2$ laser imageability is often enhanced by the presence of a NIR absorber as the absorber often helps to transform the $CO_2$ laser radiation into conductive heat.

As an example, the composition may comprise 5 to 95 wt. %, of a solvent, such as a aqueous-based solvent, and 5 to 50 wt. % of the marking complex, i.e. molybdenum (VI) peroxo complex containing an amino acid, disclosed herein. The aqueous-based solvent may comprise at least 10 wt % water, preferably at least 50 wt %, such as at lest 75 wt %, or at least 95 wt %, water.

It will be appreciated by one of ordinary skill in the art that it is possible to incorporate additives of various sorts in the imaging layers, and which might be beneficial in certain circumstances. Such additives include, for example, polymer binders, mild reducing agents to promote thermal printer performance, colorants such as dyes or pigments, light stabilizing agents such as UV-absorbers and hindered amine light stabilizers (HALS), antioxidants and other known stabilisers, pH buffers, acid and base scavengers, antiblocking materials such as talc or selected silicas, and materials adsorbent to or reactive with any thermolysis products of laser imaging, surfactants, adhesion promoters, dispersing aids, inks flow/rheology modifiers, humectants, slow drying solvents, fast drying solvents, biocides and the like.

An additive of particular utility, in solution or suspension or in a separate layer, is an electron-donating dye precursor often known as a color-former or leuco dye. When the marking complexes herein, i.e. molybdenum (VI) peroxo complexes containing an amino acid, are incorporated in a layer with such color-formers and thermally imaged, e.g. using a $CO_2$ laser, colored images may be obtained. The color may correspond to that obtained by the use of common color developers such as certain phenols. Weak block images may also be obtained, e.g. using a heat sealer at 100-120° C. and contact times of 1 to 10 seconds. Thus the marking complexes may act as an electron acceptor and color developer for at least some of these color-formers.

Another embodiment relates to a substrate coated with the composition disclosed herein. By use of the composition, to coat substrates, or parts of substrates, they may be markable. As an example, packages may be provided with date-of-packing in simple manner, although the packaging material have been produced elsewhere and is laminated. The composition may be applied by any known printing or coating process suitable for aqueous based inks such as flood coating, flexography, gravure etc. The dry coat weight may be in the range 0.1 to 20 $g/m^2$, such as 0.5 to 10 $g/m^2$, or 1 to 5 $g/m^2$.

The composition disclosed herein may be applied to flexible transparent substrates such as polymer films including: PET, PP, BOPP, PE and cellulose based films, to produce essentially transparent and colorless substrates capable of being imaged using an IR bulb/mask, scanning laser, diode array or direct contact thermal printer. The composition may also be applied to opaque flexible substrates such as pigmented polymer films, paper, corrugated card board, textiles etc. and imaged using an IR bulb/mask, scanning laser, diode array or direct contact thermal printer. It is particularly preferred to apply the coatings to pre-printed substrates that comprise, e.g. text, logos, graphics and machine readable codes such as 1-D barcodes, 2-D data matrix codes, high capacity data codes and the like. This allows images to be created in the coating layer using an IR bulb/mask, scanning laser, diode array or direct contact thermal printer, but due to its highly transparent and essentially colorless nature the un-imaged layer has only a negligible effect on the appearance of the underlying pre-printed substrate, and thus has essentially no effect on the readability of the text, logos, graphics and machine readable codes such as 1-D barcodes, 2-D data matrix codes, high capacity data codes and the like on the pre-printed substrate.

The composition may be applied directly to ridged substrates such as 3-D objects made from, e.g. glass, plastic or paper/card etc., e.g. containers suitable for the storage of solids or liquid products, particularly solid or liquid foodstuffs.

According to an embodiment, the substrate to be coated with a composition disclosed herein may be paper, cardboard, corrugated paper board, plastic film, ridged plastic parts, textile, wood, metal, glass, leather, foodstuff or a solid pharmaceutical composition.

The coating may be applied to various substrate used in the printing or packaging industry which includes: clear and opaque polymer films made from PE, BOPP, PET and cellulose based films, cellulose pulp substrates such as paper and corrugated card board, foil, glass, metals, textiles, foodstuffs and pharmaceutical unit dose preparation or pills, and the like. The transparent, markable coated substrate may be used to make items such as self-adhesive labels, packaging for food and non-food products, 3-D items such as containers for solid or liquid products including food containers, and documents such as newspaper, magazines and addressed envelopes. The marking composition may be applied to the whole of the substrate/packaging which makes the substrate/packaging suitable for use in mass customization, or it may be applied as a patch on to a relatively small portion of the substrate/packaging. The patch may then be imaged to give human readable date and lot code information and machine readable codes such as 1-D barcodes and 2-D data matrix codes and high data capacity barcodes.

Further, the substrate, to which the composition has been applied to, may also comprise any substances known in the manufacture of substrates suitable for use in printing or packaging applications. These substances may exist either within the substrate or on the surface of the substrate. Examples include a layer of clay coating on the substrate surface and barrier layers made from e.g. PE or aluminum and the like.

As well as being applied to a substrate as a coating, the marking compounds disclosed herein may also be incorporated directly into a substrate. They for example be co-extruded into polymer films or co-molded into plastic articles, or added directly into paper or card, e.g. added to paper pulp at the sizing stage.

A substrate coated with the composition disclosed herein may be over laminated. This may be done to protect the markable coating or to impart other properties to the substrate such as impermeability. The over lamination process may be done as a coating finish or by extruding a molten polymer, such as e.g. PE as a thin film, over the surface coated with the composition disclosed herein. The substrate may be over laminated by a polyolefin, such as polyethylene.

In embodiments, wherein substrates coated with the composition are to be over laminated it is preferred if the marking complex not undergoes any discoloration during the over lamination process. Particularly where the over lamination process is polymer extrusion.

A further embodiment relates to a process for marking a substrate. In such a process, the substrates to marked, or parts of it, may be coated with composition comprising a marking complex disclosed herein, i.e. molybdenum (VI) peroxo complex containing an amino acid. Examples of substrates have been provided herein above. In order to have the marking complex change color and thereby provide a mark, those parts of the coated substrate, where a marking is intended, may be exposed light in the wavelength range from 100 nm to 20,000 nm, whereby a mark may be generated. The light may be supplied in various ways. Although a bulb/mask arrangement may be used, use of lasers, diodes, or diode array systems is preferred.

$CO_2$ lasers operating in the wavelength range 10,000 nm to 11,000 nm, or NIR-lasers, diodes or diode array systems operating in the wavelength range 700 to 2500 nm may be used to supply light to generate a marking.

Further, in a process for marking a substrate, also non-contact heat, or contact heat supplied using a thermal printer may be used to obtain a marking. Thus, a marking, such as an image, a letter, a figure, or a text, may also be formed by the application of heat. The heat may be applied by a thermal contact printer, a hot air source, such as a heat gun, or the heat may be applied in the form of photonic energy from a suitable light source.

Preferably, the heat is applied locally, on irradiation with a suitable light source, which may be a non-coherent or coherent light source. The light source may be mono-chromatic or broadband.

Particularly preferred, mono-chromatic and coherent light sources are lasers. Suitable lasers may have an emission wavelength in the range 100 nm to 20,000 nm. The laser may be a continuous wave or pulsed laser.

Examples of suitable lasers include UV lasers (<400 nm), visible band lasers (400 nm to 700 nm), Nd:YAG lasers/NIR fiber lasers (700 nm to 2,500 nm), and mid-IR $CO_2$ lasers with an emission wavelength in the range 10,000 nm to 12,000 nm.

Lasers typically apply light to a substrate using a steered beam system. However, a mask arrangement may also be used.

Other light sources include diodes, diode arrays, fiber coupled diode arrays and bulb/mask arrangements. Diode array systems, which may emit both coherent and non-coherent light, are particularly suitable for use in high speed continuous or 'on the fly' imaging.

Where a substrate coated with a composition disclosed herein have been over laminated, it is preferred to use a light source that emits light that will not be absorbed by the over laminate. Particularly preferred examples are Nd:YAG lasers/NIR fiber lasers operating with an emission wavelength in the near infrared range, i.e. 700 nm to 2,500 nm. However, as already outlined, in order to utilize such wavelengths the composition it is preferred if the composition further comprises a substance capable of absorbing near infrared light and converting it into conductive heat.

Another embodiment relates to a marked substrate. Such a marked substrate is obtainable as just described.

In addition to comprising a marking complex, i.e. a molybdenum (VI) peroxo complex containing an amino acid, the composition may comprise one or several further marking compound(s). Examples of such other marking compounds include char forming compounds and other types of marking compounds known with the art. Examples of further marking compounds are provided below.

Char forming compounds are those that on heating form a colored char; typically brownish or blackish. Preferred examples of char forming compounds include polyhydroxy compounds selected from the group consisting of carbohydrates such as monosaccharides, disaccharides and polysaccharides, and derivatives thereof wherein the carbonyl group has been reduced to a hydroxyl group, so-called sugar alcohols.

Examples monosaccharides are the sugars: glucose, mannose, galactose, arabinose, fructose, ribose, erythrose and xylose. Examples of disaccharides are the sugars: maltose, cellobiose, lactose and sucrose. Examples of polysaccharides are cellulose, starch, gum arabic, dextrin and cyclodextrin. Examples of sugar alcohols are meso-erythritol, sorbitol, mannitol and pentaerythritol. More preferred polyhydroxy compounds are disaccharides, polysaccharides and sugar alcohols.

Most preferred polyhydroxycompounds are sucrose, gum arabic and meso-erythritol. When a polyhydroxy compound can exist as the D-enantiomer, the L-enantiomer or the racemate, all these three forms are comprised. Optionally a salt can be added to assist char formation, examples include sodium borate, ammonium sulphate, ammonium phosphates, sodium carbonate and sodium bicarbonate.

In addition to char forming compounds also other marking compounds known with the art may be added to the composition comprising a transition metal oxyanion and at least one ammonium cation. Examples of such other marking compounds taught in WO2007/045912, WO2002/068205, WO2006/129078, WO2010/026407, WO2002/074548, GB2447659, WO2004/043704, WO2006/018640, WO2007/063339, WO2010/029331, WO2010/029329, WO2006/051309, WO2009/093028, WO2010/001171, WO2010/049282, WO2010/049281, WO2010/045274, WO2009/010405, WO2009/010393, WO2008/107345, WO2008/110487, WO2008/083912, WO2008/055796, WO2007/088104, WO2007/031454, WO2007/012578, WO2006/108745 and WO2006/067073.

According to an embodiment, the composition disclosed herein may also comprise pigments. Pigments may be water-dispersible inorganic or organic additives such as calcium carbonate etc. One or more of a range of additives may be utilized, including surfactants or lubricants such as zinc stearate etc.

The marking complexes, i.e. molybdenum (VI) peroxo complex containing an amino acid, disclosed herein are also suitable for formulation into non-aqueous or organic solvent based coating systems, where they may form a dispersion or suspension, which can be applied to a substrate using any coating or printing process suitable for organic solvent based inks, such as Gravure printing, tampo printing, UV flexo printing reverse gravure, spin coating and the like.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

EXPERIMENTAL

The following examples are mere examples and should by no mean be interpreted to limit the scope of the invention. Rather, the invention is limited only by the accompanying claims.

All chemicals and reagents were standard laboratory grade and were purchased from Sigma-Aldrich.

EXAMPLE 1

Synthesis of 'Glycine-Peroxo-Molybdate'

Molybdenum (VI) oxide (4.32 g, 30 mmol) was stirred in aqueous hydrogen peroxide solution (240 ml (30% w/v)) at 20° C. The slurry was then heated to 60° C. and then left stirring at 50 to 60° C. for 2 hours. After this time a yellow solution at pH=0 was obtained.

Glycine (2.25 g, 30 mmol) was then added to the yellow solution prepared above, and stirring continued for a further 1 hour at 50 to 60° C. After this time the reaction mixture was then left to cool, stationary, overnight.

The next morning yellow crystals had formed in the reaction mixture. The crystals were collected by vacuum filtration, washed with water (200 ml), pulled dry and then dried completely in a vacuum desiccator at 20° C. to yield 3.24 g of bright yellow crystals.

The obtained crystals were unexpectedly found to more easily change color into black upon heating than AOM, i.e. they are more reactive and require less fluence to obtain the same optical density. It was thus envisaged that the molybdenum (VI) peroxo complexes containing amino acids may find used in marking applications.

In order to evaluate the use of molybdenum (VI) peroxo complexes containing amino acids in marking applications the obtained crystals were formulated into an ink formulation (cf. example 2).

EXAMPLE 2

Ink Formulation

| | |
|---|---|
| 1. Induprint 281 (aqueous binder) | 40.0 wt % |
| 2. Glascol LS2 (aqueous binder) | 14.2 wt % |
| 3. Agitan 350 (surfactant) | 0.5 wt % |
| 4. Tyzor LA (adhesion promoter) | 0.5 wt % |
| 5. DEG (retarder) | 2.0 wt % |
| 6. r-ITO (NIR absorber) | 2.5 wt % |
| 7. Glycine peroxo-octamolybdate crystals (colour former) | 30.0 wt % |
| 8. Aerosil 200 (dispering aid) | 0.3 wt % |
| 9. Water (solvent) | 10.0 wt % |

EXAMPLE 3

Evaluation of Imaging Properties

The formulation was compared to an ink formulation comprising AOM

| Ink formulation comprising AOM | |
|---|---|
| Glascol LS2 (binder) | 15% |
| Dispelair CF49 (anti-foam) | 1% |
| DEG (retarder) | 1% |
| Tyzor LA (adhesion promoter) | 1.5% |
| r-ITO (NIR absorber) | 2.5% |
| Lucidene 198 (binder) | 35% |
| Ammonium octamolybdate (colour former) | 30% |
| Water | 14% |

Both ink formulations were drawn down on to clay coated cardboard using an 18 cm$^3$/m$^2$ Anilox hand held flexiproofer (coat weight approximately 8 to 10 g/m$^2$). Laser imaging was then performed using a 10 W, 1550 nm fibre laser. The resulting Fluence vs. optical density (black) data is presented in Table 1 below.

TABLE 1

Fluence vs. optical density (black) data

| Fluence | Optical density | |
|---|---|---|
| J/cm$^2$ | OXM | AOM |
| 0 | 0 | 0 |
| 0.4 | 0.1 | 0.04 |
| 0.8 | 0.15 | 0.05 |
| 1.2 | 0.15 | 0.09 |
| 1.6 | 0.25 | 0.3 |
| 2 | 0.55 | 0.44 |
| 2.4 | 0.725 | 0.51 |
| 2.8 | 0.95 | 0.53 |
| 3.2 | 1.1 | 0.50 |
| 3.6 | 1.05 | 0.44 |
| 4 | 1 | 0.35 |

As seen from Table 1, an ink formulation comprising "glycine-peroxo-molybdate" (OXM) does display greater reactivity than a formulation comprising ammonium octamolybdate (AOM), i.e. AOM provides lower ODB at the same fluence than OXM. Further does a coated ink formulation comprising OXM display better transparency one comprising AOM (ΔE OXM=24.01 vs. ΔE AOM=59.92).

The invention claimed is:

1. An ink formulation for a marking application, the ink formulation comprising molybdenum (VI) peroxo complex containing an amino acid.

2. The ink formulation according to claim 1, wherein said complex is a complex according to the general formula (I)

$$Mo_xO_y(O_2)_zL_a(H_2O)_b \qquad (I)$$

wherein
"x" is an integer of 1 to 5;
"y" is an integer of 1 to 10;
"z" is an integer of 1 to 5;
"a" is an integer of 1 to 3;
"b" is an integer of 1 to 10; and
L is an amino acid.

3. The ink formulation according to claim 2, wherein said amino acid is selected from the group consisting of glycine, alanine, valine, leucine, isoleucine, proline, methionine, serine, threonine, asparagine, glutamine, aspartic acid, glutamic acid, lysine, histidine, and glycylglycine.

4. The ink formulation according to claim 3, wherein said amino acid is glycine, whereby said complex may be represented by the following formula $MoO(O_2)_2(GLY)(H_2O)$.

5. The ink formulation according to claim 1, wherein said marking application comprises utilizing of a NIR-laser.

6. A composition comprising molybdenum (VI) peroxo complex containing an amino acid, a solvent, and a water-soluble or water-dispersable polymeric binder, wherein said complex is complex according to the general formula (I)

$$Mo_xO_y(O_2)_zL_a(H_2O)_b \qquad (I)$$

wherein
"x" is an integer of 1 to 5;
"y" is an integer of 1 to 10;
"z" is an integer of 1 to 5;
"a" is an integer of 1 to 3;
"b" is an integer of 1 to 10; and
L is an amino acid.

7. The composition according to claim 6, wherein said solvent is an aqueous solvent.

8. The composition according to claim 6, wherein said amino acid in the molybdenum (VI) peroxo complex is glycine, whereby said complex may be represented by the following formula $MoO(O_2)_2(GLY)(H_2O)$.

9. The composition to according to claim 6, further comprising a light absorbing agent that absorbs light in the wavelength range 700 nm to 2500 nm.

10. The composition according to claim 9, wherein the light absorbing agent is reduced indium tin oxide.

11. The composition according to of claim 6, comprising 5 to 95 wt. % of the solvent and 5 to 50 wt. % of the molybdenum (VI) peroxo complex.

12. A substrate coated with the composition according to claim 6.

13. The substrate according to claim 12, wherein said substrate is paper, cardboard, corrugated paper board, plastic film, ridged plastic parts, textile, wood, metal, glass, leather, foodstuff, or a solid pharmaceutical composition.

14. The substrate according to claim 12, wherein said coated substrate is over laminated by a polyolefin.

15. A process for marking a substrate, comprising the steps of:
providing a coated substrate according to claim 12; and
exposing parts of the coated substrate where a marking is intended, to light in the wavelength range from 100 nm to 20,000 nm in order to generate a marking.

16. The process according to claim 15, where the light is supplied by a $CO_2$ laser operating in the wavelength range 10,000 nm to 11,000 nm, or a laser, a diode or diode array system operating in the wavelength range 700 to 2500 nm.

17. A process for marking a substrate, comprising the steps of:
providing a coated substrate according to claim 12; and
exposing those parts of the coated substrate where a marking is intended, to a non-contact heat, or contact heat supplied utilizing a thermal printer.

18. A marked substrate obtained by the process according to claim 17.

19. A marked substrate obtained by the process according to claim 15.

20. The substrate according to claim 12, wherein said coated substrate is over laminated by a polyethylene.

* * * * *